US011188523B1

(12) United States Patent
Harold (10) Patent No.: US 11,188,523 B1
(45) Date of Patent: Nov. 30, 2021

(54) DISTRIBUTED LEDGER OBJECT ROUTER FOR TRANSACTIONS, CONTRACTS AND DATA

(71) Applicant: GoKnown LLC, Greenwich, CT (US)

(72) Inventor: Michael D. Harold, Shreveport, LA (US)

(73) Assignee: GoKnown LLC, Aventura, FL (US)

(*) Notice: Subject to any disclaimer, the term of this patent is extended or adjusted under 35 U.S.C. 154(b) by 0 days.

(21) Appl. No.: 16/993,038

(22) Filed: Aug. 13, 2020

Related U.S. Application Data (60) Provisional application No. 62/888,011, filed on Aug. 16, 2019.

(51) Int. Cl.
| | |
|---|---|
| *G06F 16/27* | (2019.01) |
| *G06F 21/60* | (2013.01) |
| *H04L 9/08* | (2006.01) |
| *H04L 9/14* | (2006.01) |
| *G06F 16/23* | (2019.01) |
| *H04W 88/02* | (2009.01) |
| *G06Q 50/28* | (2012.01) |
| *G01S 19/13* | (2010.01) |

(52) U.S. Cl.
CPC .......... *G06F 16/2379* (2019.01); *G06F 16/27* (2019.01); *G06F 21/602* (2013.01); *H04L 9/0858* (2013.01); *H04L 9/0869* (2013.01); *H04L 9/14* (2013.01); *G01S 19/13* (2013.01); *G06Q 50/28* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 10,623,173 | B1* | 4/2020 | Geng | H04L 7/033 |
| 2019/0026146 | A1* | 1/2019 | Peffers | G06F 9/5044 |
| 2019/0208422 | A1* | 7/2019 | Haleem | G06F 16/1824 |
| 2020/0186607 | A1* | 6/2020 | Murphy | H04L 12/1428 |
| 2020/0328886 | A1* | 10/2020 | Newton | H04L 9/0869 |
| 2021/0019429 | A1* | 1/2021 | Cooner | G16Y 30/10 |

* cited by examiner

*Primary Examiner* — Aleksandr Kerzhner
*Assistant Examiner* — Eddy Cheung
(74) *Attorney, Agent, or Firm* — St Onge Steward Johnston and Reens LLC (57) ABSTRACT

A system, method and apparatus in which a client computer initiates and communicates a distributed ledger transaction either to an individual node in a network of distributed ledger nodes or to the network itself, which transaction is labeled with a nanosecond scale timestamp, encrypted using quantum event generated random binary data and then securely transmitted to other ledger nodes in the network at substantially the same time. Networks may consist of traditional wireline and wireless networks, cloud networks and 5G wireless networks in any combination and configuration. Using the invention, distributed ledger networks may take the forms of blockchains, transactionally integrated multiple distributed ledgers, decentralized exchanges, or immutable distributed databases. After the transaction is transmitted, additional messages necessary to the completion of the transaction are communicated between ledger nodes in the network using the same or similar system, method and apparatus.

21 Claims, 4 Drawing Sheets

DISTRIBUTED LEDGER OBJECT ROUTER FOR TRANSACTIONS, CONTRACTS AND DATA

FIELD OF THE INVENTION

The present invention relates generally to methods for electronically receiving and transmitting distributed ledger transactions and messages between and among a multiplicity of computing nodes in a distributed ledger network.

BACKGROUND OF THE INVENTION

In an increasingly globalized economy in which transactions are required to traverse both public and private networks of individuals, corporations, national boundaries and continents at speeds and volumes that continue to increase by orders of magnitude, distributed ledgers and their associated blockchain technologies have emerged as a preferred solution. In 2008, Satoshi Nakamoto published the Bitcoin White Paper which described a decentralized, distributed, peer-to-peer, public network of nodes able to provide secure, anonymous, automated payment services between two parties. On Jan. 3, 2009 the bitcoin network became operational when Satoshi Nakamoto mined the genesis (i.e., first) block of bitcoin. One of the key features of the system was and remains the ability to incentivize operators of the nodes by providing them a means to acquire bitcoin currency by being the first to mine (i.e., process) transactions in groups or "blocks" of transactions. Each group of transactions and each transaction within each block is linked together using a one-way cryptographic function that converts plain text to a unique fixed-length text message called a hash. Since there is no way to reverse the hash process to recover the original text, these hashes are used to immutably link all of the transactions processed by the distributed ledger beginning with the first transaction. Because the hashing process is computationally intensive, block mining normally consists of solving a hashing problem of predetermined complexity in order to receive credit for mining the next block in the chain. The creation of a new block requires the approval of other nodes on the network, each of which has a complete and identical copy of the blockchain/ledger record beginning with the first transaction and continuing to the most recent block. This voting approval process makes it difficult to alter completed transactions without the alteration being discovered by the other nodes, greatly increasing the security of the system and the integrity of its data. The computationally intensive nature of the block mining process results in a slower operation of the system than would be possible without block mining. Since transactions are completed in blocks of multiple transactions and since no new group of transactions can be considered completed until the most recent block is recorded, each block in the ledger is essentially a "tick" of the blockchain clock. This "tick" of the blockchain clock is an implicit yet distinct function, separate and apart in purpose from the operator incentive which is block mining. Since the original bitcoin ledger was implemented in 2009, new distributed ledger and blockchain architectures have proliferated. The majority of distributed ledger implementations to date have continued to provide similar incentives for block mining. From a transaction processing point of view, block mining is a batch process. This has proven a major impediment to increasing the speed and transactional throughput of blockchain technology. What is needed to replace this batch process is a means of processing individual transactions in time order across the network. Such an approach to distributed ledger transaction processing is much faster, provides higher throughput and more closely conforms to standard database processes, especially as they relate to concurrency control as a means of ensuring both transactional and data integrity.

None of the presently known methods of distributed ledger transaction processing, however, are able to provide highly secure and scalable transactions while at the same time providing all of the important key features of the underlying blockchain technology which include immutability, decentralization, consensus, security and automation. Specifically, the prior art fails to demonstrate any system or method in which a client computer initiates and communicates a distributed ledger transaction, smart contract or data, hereinafter referred to collectively as "transaction", to an individual node in a network of distributed ledger nodes or to the network itself, which transaction is labeled with a nanosecond scale timestamp derived from a GPS signal in order to preserve its time order and first-in, first-out (i.e., FIFO) position across all nodes in the network, each of which nodes may also receive and process incoming transactions in like manner. Additionally, the prior art fails to describe the encryption of said transaction using a quantum event generated random binary key. Additionally, no prior art implements these features using 5G wireless communications as a means of placing the distributed ledger network nodes in close proximity to the client device and transaction, thereby minimizing the time and distance between the client and ledger node network. Furthermore, none of the prior art describes a system, method and apparatus that can be easily integrated with existing, blockchain-based distributed ledger networks as a way to improve the speed, volume and security of their transactions.

There is, therefore, a present need to provide an improved paradigm for managing distributed ledger transactions that overcomes the aforementioned constraints.

SUMMARY OF THE INVENTION

A system, method and apparatus in which a client initiates and communicates a distributed ledger transaction to an individual node in a network of distributed ledger nodes or to the network itself, which transaction is first labeled with a nanosecond scale timestamp before it is encrypted using quantum event generated random binary digits and then securely transmitted to the other ledger nodes in the network. This allows the highly secure and time ordered communication of all transactions and transaction-related messages to the system with minimal risk of collision or race conditions.

In contrast to the traditional distributed ledger transaction processing model, the present invention permits the secure and rapid transfer of transactions among multiple distributed ledger nodes in a network. To accomplish this, the present invention combines the time ordering of transactions as they are received in real or near-real time, the secure communications of those transactions between ledger nodes, the minimization of network latencies associated with each transaction and the minimization of server and network operating costs associated with each transaction. The present invention is accordingly designed for use as a hardware and software system, method and apparatus capable of transmitting and receiving high volumes of distributed ledger transactions in an automated, peer-to-peer, replicated and decentralized computing environment. Specifically, the decentralized computing environment has as one of its key features a guarantee of first in, first out FIFO transaction processing that removes the need for traditional block-based transaction processing. This is made possible through the use of a nanosecond scale timestamp which is added to each new incoming transaction at the point at which it enters the network. This operation maintains the time order among all transactions being processed by all ledger nodes in the network. In a 1 Gbps network, this translates to thousands of distributed ledger transactions per second. Higher bandwidth capacity (e.g., 10 Gbps, 100 Gbps, etc.) provides a commensurably higher rate of message transmission. Another feature is the encryption of each transaction message between ledger nodes using a quantum event generated random binary number for use as a private encryption key, public encryption key, one-time pad (i.e., OTP) or nonce. A further feature is the ability to use the present invention to create distributed ledger networks that receive data or attributes from blockchains, secure data stores, decentralized exchanges, or immutable, general purpose distributed databases.

It is, accordingly, an object of the present invention to set forth an improved paradigm for distributed ledger transaction processing.

It is another object of the present invention to provide a system, method and apparatus able to maximize the speed and throughput of distributed ledger transactions.

It is a further object of the present invention to provide a system, method and apparatus by which transactions can be securely transmitted using multiple encryption methods that include public keys, private keys and nonces composed wholly or in part of quantum event based random binary digits.

It is a further object of the present invention to provide a system, method and apparatus able to create an edge computing network using 5G wireless communications as a means of placing the routing, logic and messaging components of a distributed ledger network node in close proximity to the client devices originating transactions.

It is a further object of the present invention to enable the creation of a distributed ledger using handheld wireless devices, including smartphones and Internet of Things (IoT) devices, as distributed ledger nodes in a network.

It is a further object of the present invention to provide a system, method and apparatus that is able to transmit transaction-related messages between ledger nodes in a distributed ledger network using the same systems and methods as those used to transmit the original transactions.

BRIEF DESCRIPTION OF THE DRAWINGS

A more complete understanding of the system, method and apparatus of the present invention may be obtained by reference to the following Detailed Description when taken in conjunction with the accompanying Drawings.

DETAILED DESCRIPTION OF THE INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

Figure 1:
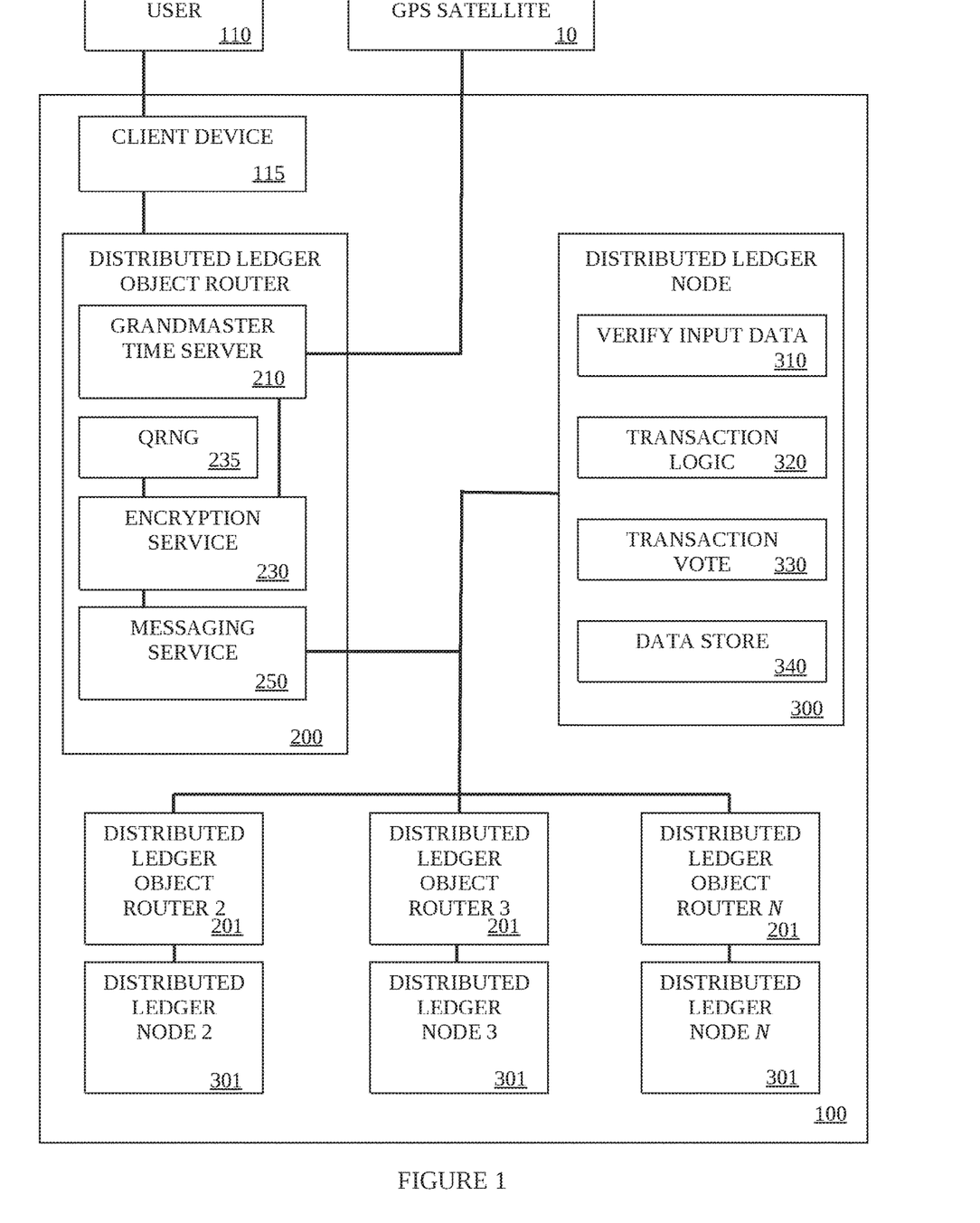
FIG. 1 illustrates the operation of the distributed ledger object router in a distributed ledger network.

With reference now to FIG. 1 of the Drawings, there is illustrated therein a first embodiment for practicing the principles of the present invention, which operates within a distributed communications network, generally designated by the reference numeral 100. In particular, a user 110 of the network 100 uses any of a variety of client devices, including a desktop, laptop, tablet, smartphone, or any other personal computing wireline or wireless computing device, generally designated by the reference number 115, that has as part of its function the ability to initiate and/or participate in multi-party transactions over the network. As shown in the figure, the user 110 uses said client device 115 to initiate a transaction with the distributed ledger object router 200 over the network 100. In the present example, the distributed ledger object router 200 communicates directly with at least one ledger node 300 on the network. The distributed ledger object router 200 first timestamps the transaction using a nanosecond scale time stamp accurate to 100 nanoseconds or less. The nanosecond scale timestamp is provided by a grandmaster time server 210 able to maintain its accuracy using GPS signals received from one or more GPS satellites 10. The term "GPS" as used in the specification and claims in this application is defined as any geospatial positioning system (including the combined use of multiple geospatial positioning systems) such as GNSS, especially the US GPS system and other government sponsored systems such as GLONASS (Russia), Galileo (EU), Beidou (China), as well as commercially launched systems such as Iridium, SpaceX, or other future systems. Each grandmaster time server 210 in each distributed ledger object router 200 operates in the same manner. Some preferable embodiments include a physical GPS receiver locked to Universal Coordinated Time able to receive GPS signals from the GPS satellite(s) and to provide nanosecond time scale timestamps accurate to 100 nanoseconds or less. The use of a nanosecond scale timestamp allows a high volume of transactions to be processed asynchronously by each ledger node 300 in the network in a time order that is identical across all ledger nodes while at the same time minimizing potential collisions and race conditions.

A nanosecond is one billionth of a second, so in a decimal system, the nanosecond can be represented by 9 decimals. An exemplary representation of a nanosecond timestamp could accordingly be a date such as Aug. 7, 2020 rendered numerically as 20200807, followed by a time (hour/minute/ second+nanosecond) such as 15:21:53.000000001. A complete timestamp rendered in this way in decimal form might read 20200807152153000000001. However, in most systems, the timestamp is not generated in this format; instead it is a long integer string that represents the number of nanoseconds that have elapsed since an origin point, called the epoch. Most software applications using timestamps use Jan. 1, 1970 at midnight as the "epoch", although technically an application can choose any moment in time.

Following the addition of the timestamp to the transaction, the transaction is encrypted by an encryption service 230 that uses, as part of its operation, a physical quantum random number generator or QRNG 235 to create public encryption keys, private encryption keys, nonces and one time key pads in any combination that meet the entropy and other security requirements defined by standards that include, but are not limited to, AIS31 PTG.3. In the case of transactions having smaller length transactions, such as payment transactions, a one time key pad is used to encrypt transactions the size of which is equal to or smaller than the Ethernet maximum transmission unit (MTU) size of 1500 bytes. This allows the transaction to be transmitted by the distributed ledger object router 200 in a single network layer transaction. Following the encryption of the transaction data, a messaging service 250 communicates the transaction data to its associated ledger node 300 and to other distributed ledger object routers 201 on the network 100. As part of their transaction processing workflow, each ledger node 300 receiving the transaction processes the transaction as follows: It first verifies the input data 310. If the verification is successful, the node executes the transaction logic 320 associated with the transaction. Following the execution of the transaction logic, the ledger node 300 votes to either confirm or deny the transaction 330. If the verification of the input data 310 or the execution of the transaction logic 320 does not meet the requirements for a successful vote, the vote result is "NO". Otherwise, the vote result is "YES". The vote result is transmitted to that ledger node's 300 object router 200 where it is communicated via the messaging service 250 to the other ledger nodes in the network. Once the number of "YES" votes reaches the consensus majority vote threshold (ex. 51% or higher) for approval of the transaction, the transaction is added to each ledger node's persistent data store 340 as part of the immutable record of all transactions maintained separately by all ledger nodes in the network.

The benefits of the precision provided by a timestamp accurate to 100 nanoseconds or less will be understood by those of ordinary skill in the art. By splitting each second into (at least) 10 million independent values applicable as a timestamp-in some embodiments up to a billion independent values—the likelihood of a duplicate timestamp between two or more transactions becomes exceedingly unlikely, minimizing the risk of collisions and race conditions, which are often difficult to identify and resolve. Each timestamp is accordingly preferably generated as a 17 to 19 digit string of integers representing the number of nanoseconds (or 10 s or 100 s of nanoseconds) that have elapsed since a predetermined origin point. The timestamp is preferably appended to header information associated with the transaction, preferably with an identifier, but may be applied to the transaction in other known ways as well.

The physical quantum random number generator 235 uses physical quantum event generated random binary digits to generate encryption keys, one-time pads, and/or nonces. The randomness of the numbers associated with the fundamentally random physical quantum events provide state-of-the-art encryption in electronic transaction security. Some exemplary physical quantum phenomena that can be measured/observed for generating said random numbers include electromagnetic field fluctuations in a vacuum, shot noise in an electrical circuit, nuclear decay as detected using a Geiger counter, and the transmission or reflection of photons through a semi-permeable surface. Assigning a numerical value to the random outcomes of such quantum events provides the basis for the generation of fundamentally random encryption values, as will be understood by those of ordinary skill in the art.

Figure 2A:
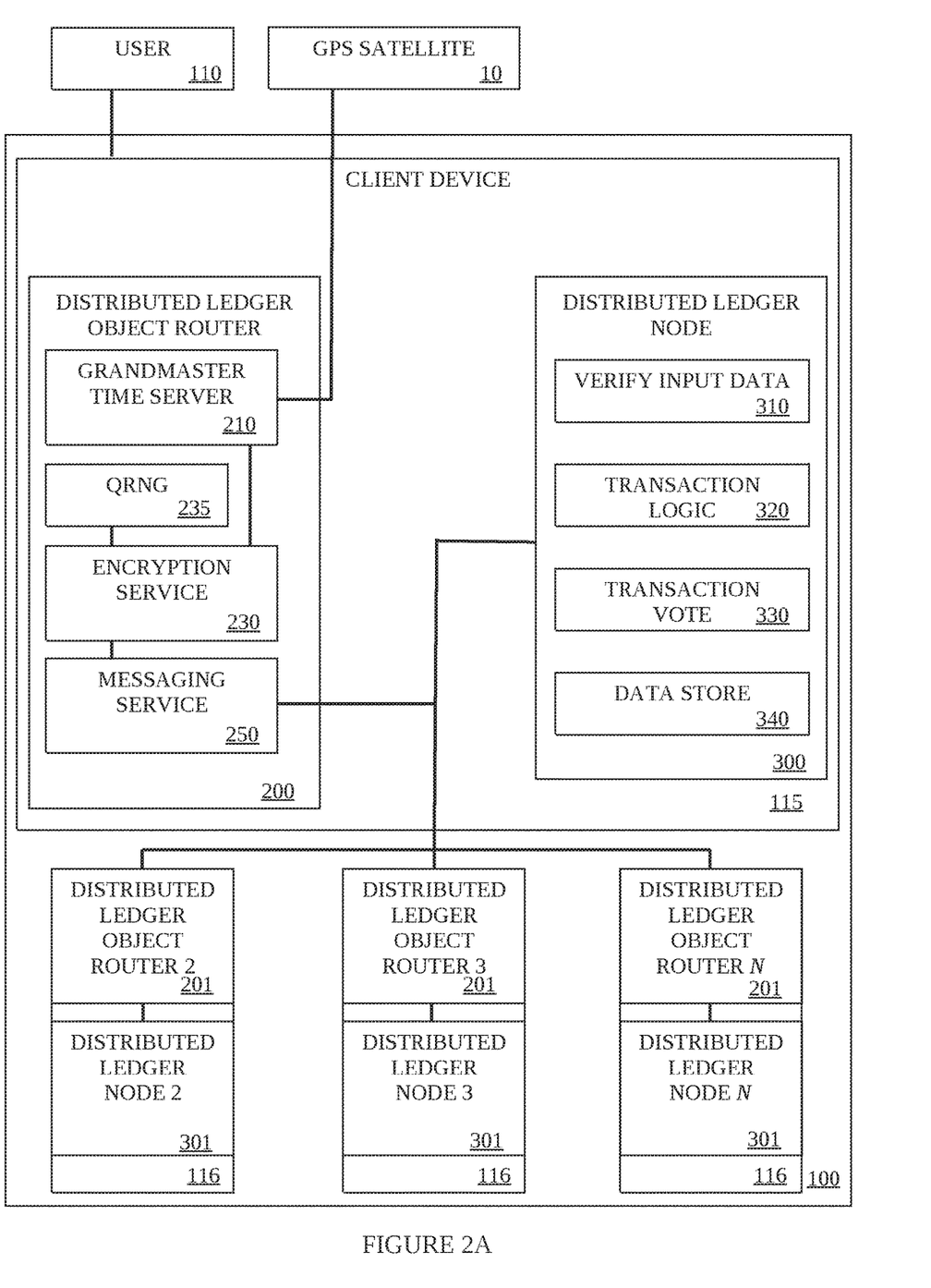
FIG. 2A illustrates the operation of a distributed ledger network comprised of client devices each containing a distributed ledger object router and distributed ledger node.

With reference now to FIG. 2A of the Drawings, there is illustrated therein another embodiment of the present invention, the creation of a distributed ledger network comprised of client devices of any type, each consisting of a distributed ledger object router and ledger node and each of which operates within a distributed communications network, said network generally designated by the reference numeral 100.

In particular, a user 110 of the network 100 uses the client device 115 to interoperate with same or dissimilar client devices 116. Said client devices 116 include but are not limited to a desktop, laptop, tablet, smartphone or other handheld device, or any other computing wireline or wireless computing device, that has as part of its function the ability to initiate and/or participate in any type of multi-party transaction over the network. Additionally, client devices 115/116 may take the form of automated and/or embedded devices including but not limited to home automation devices, smart city monitoring and automation devices, manufacturing devices, supply chain monitoring and control devices, virtual reality and augmented reality devices, GIS surveillance and mapping devices such as drones, and ground and air personnel or material transport devices of any type.

In the present example, each client device's 115/116 distributed ledger object router 200 communicates directly with its corresponding ledger node 300 which is contained in the same device 115/116. In all cases, the distributed ledger object router 200 first timestamps the transaction using a nanosecond scale time stamp accurate to 100 nanoseconds or less. The grandmaster time server 210 in each distributed ledger object router 200 operates in the same manner. Depending on the size, power and other operating characteristics of each client device 115/116, the grandmaster time server 210 may take the form of a component assembly, chip assembly or single chip. Following the addition of the timestamp to the transaction, the transaction is encrypted by an encryption service 230 that uses, as part of its operation, a physical quantum random number generator or QRNG 235 to create encryption keys, nonces and one time key pads. As is the case with the grandmaster time server 210, depending on the size, power and other operating characteristics of each client device 115/116, the QRNG 235 may take the form of a component assembly, chip assembly or single chip. Following the encryption of the transaction data, a messaging service 250 communicates the transaction data to its client device's 115 associated ledger node 300 and to other client devices 116 on the network. At the completion of each transaction, the client device's 115/116 ledger node 300 adds the transaction to that ledger node's 300 persistent data store 340 as part of the immutable record of all transactions maintained separately by all ledger nodes in the network.

Figure 2B:
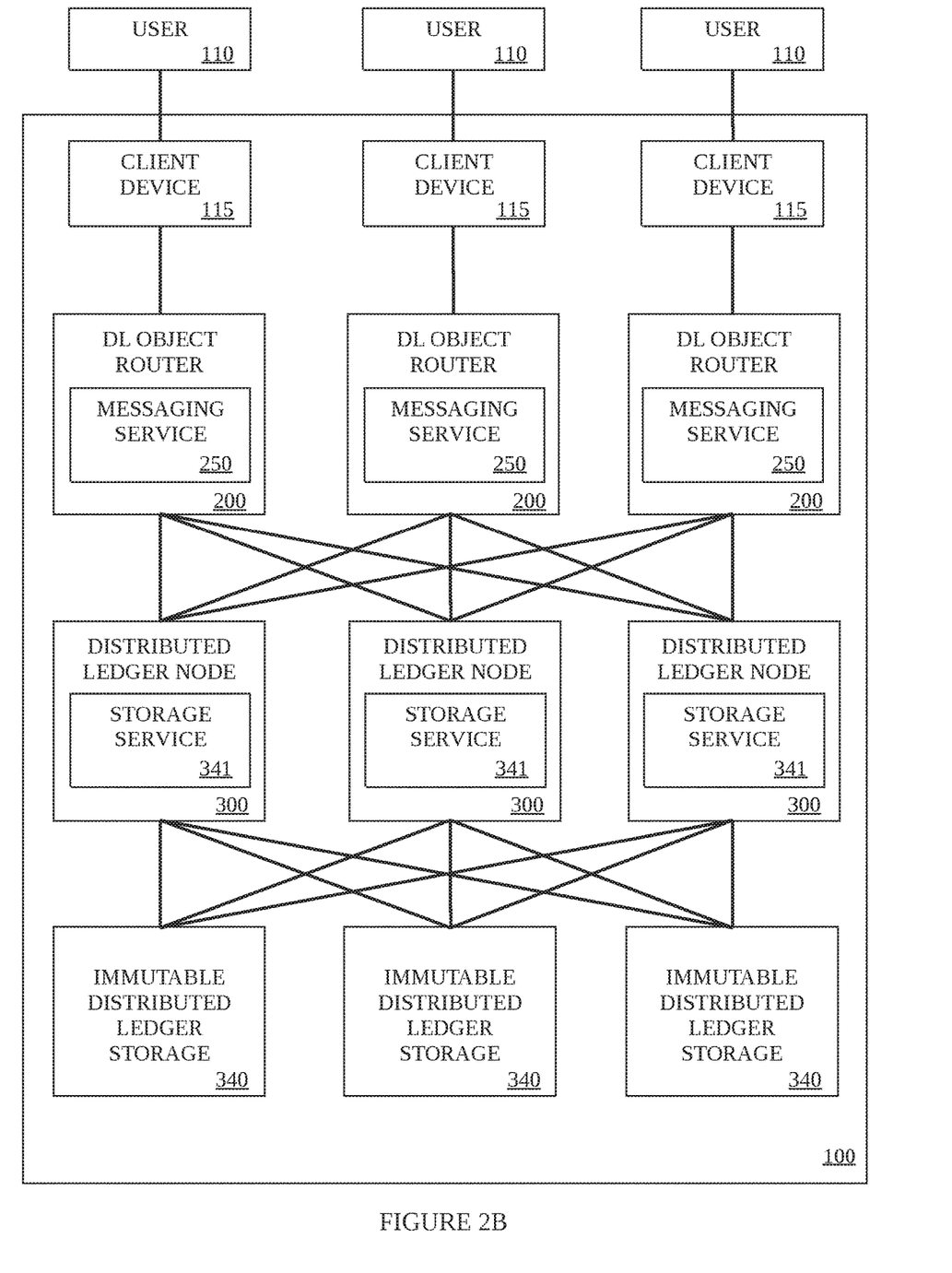
FIG. 2B illustrates the operation of an any-to-any network of distributed ledger object routers, ledger nodes and storage nodes.

With reference now to FIG. 2B of the Drawings, there is illustrated therein another embodiment of the present invention describing any-to-any communications between distributed ledger object routers, distributed ledger nodes, and distributed ledger storage. The availability of cloud and intercloud computing, 5G wireless edge clouds and other types of distributed, virtualized computing networks provides an opportunity to enable shortest path routing, load balancing and other methods of maximizing the throughput of distributed ledger transactions using any-to-any communications between system services and components.

In particular, a user 110 of the network 100 uses a client device 115 to initiate a transaction with a distributed ledger object router 200 over the network 100. In the present example, the distributed ledger object router 200 uses its messaging service 250 to transmit the client device 115 transaction to the other ledger nodes 300 on the network. As part of their transaction processing workflow, each ledger node 300 receiving the transaction processes the transaction, and communicates the resulting vote to the other ledger nodes 300 by communicating said result through one of the distributed ledger object routers 200. In order to secure, decentralize and scale the storage of the distributed ledger's immutable transaction record, following completion of the vote and approval of the transaction, each distributed ledger node storage service 341 writes the completed transaction to one or more distributed ledger storage locations 340. Multiple storage locations 340 may be used by each ledger node 300 for purposes of scale, performance and security.

Figure 3:
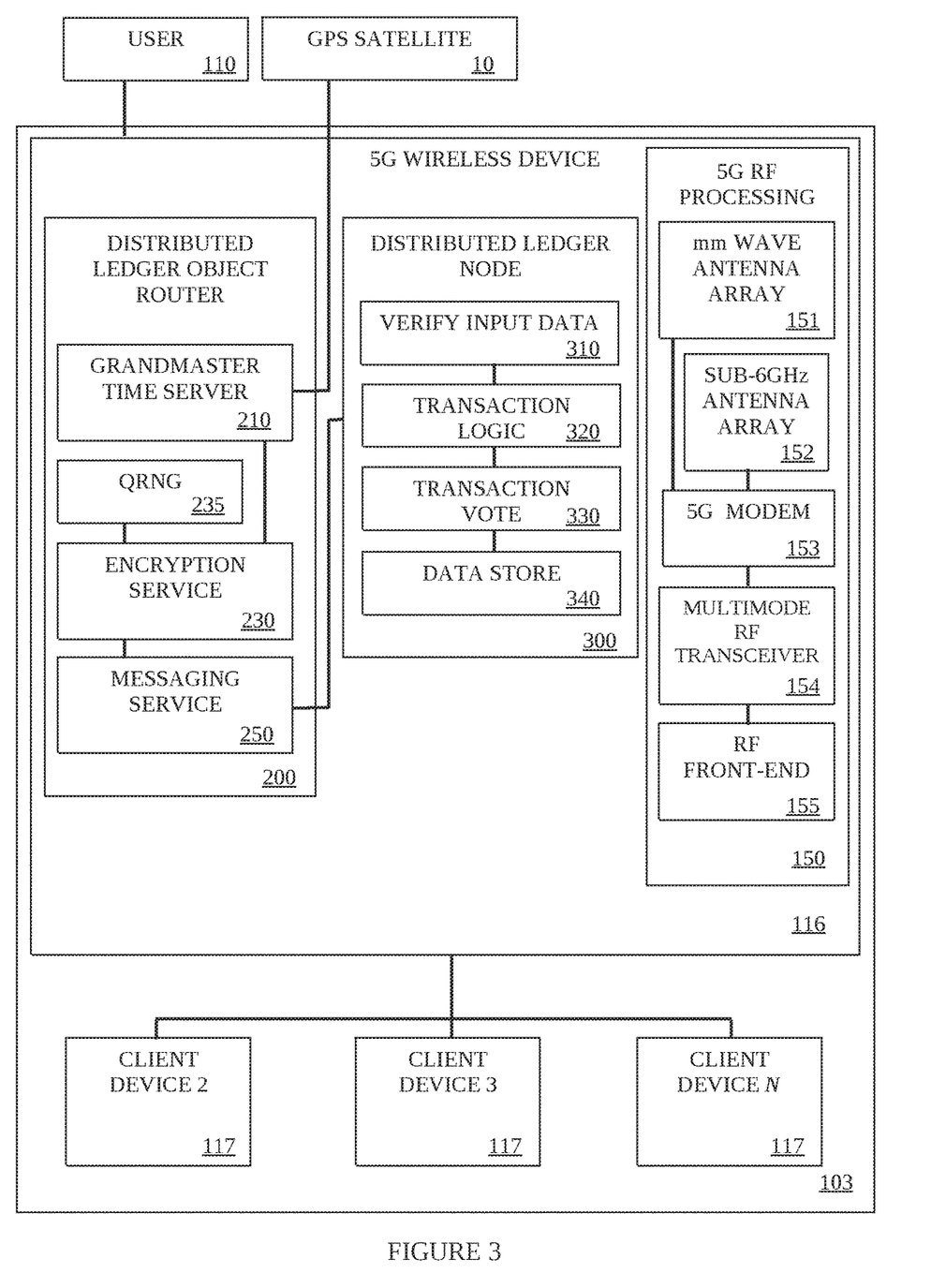
FIG. 3 illustrates the operation of the distributed ledger object router and its associated distributed ledger node using a smartphone or other small form factor wireless device such as an IoT device in a 5G wireless implementation of the distributed ledger network comprised of small form factor 5G wireless devices.

With reference now to FIG. 3 of the Drawings there is illustrated therein another embodiment of the present invention, the operation of the distributed ledger object router and its associated distributed ledger node using a 5G smartphone or other small form factor 5G wireless device, all of which operate within a 5G wireless distributed communications network, said network generally designated by the reference numeral 103.

In particular, a user 110 of the network 103 uses any one of a variety of 5G enabled devices including smartphones, snapons (i.e, dongles), remote controlled IoT devices, automated and/or embedded IoT devices, and mobile devices of any type, generally designated by the reference numbers 116 and 117, each of which has as part of its function the ability to initiate and/or participate in any type of multi-party transaction over the 5G network 103. As shown in the figure, the user 110 uses said client device 116 to initiate a transaction with the distributed ledger object router 200 over the network 103.

All incoming and outgoing communications to and from any 5G mobile device 116 and 117, is processed by the 5G RF processing block 150 which consists of a mm wave antenna array 151, a sub-6 GHz antenna array 152, a 5G modem 153, a multi-mode RF transceiver 154 and an RF front end module 155 or FEM.

In the present example, the distributed ledger object router 200 communicates directly with at least one ledger node 300 on the network 103. The distributed ledger object router 200 timestamps the transaction. Following the addition of the timestamp to the transaction, the transaction is encrypted using an encryption service 230 that uses a QRNG 235 to create encryption keys, nonces and one time key pads. Following the encryption of the transaction data, a messaging service 250 communicates the transaction data to its associated ledger node 300 and to other client devices 117 in the network 103, each of which other client devices 117 contains the same or similar components and services as the client device 116 originating the transaction. The ledger node 300 verifies the input data 310, executes the transaction logic 320, votes to either confirm or deny the transaction 330 and communicates the results to the other client devices 117 in the network 103. Once the vote reaches the consensus majority vote threshold for approval of the transaction, the transaction is added to each ledger node's persistent data store 340 as part of the immutable record of all transactions maintained separately by all ledger nodes in the network.

What is claimed is:

1. A method for processing distributed ledger transactions comprising the steps of:
   initiating a distributed ledger transaction using a client device in electronic communication with a first distributed ledger object router to generate transaction data;
   generating a timestamp for the transaction, the timestamp including timestamp data identifying a time when the transaction data was generated and having an accuracy of 100 nanoseconds or less, said timestamp data being directly derived from a GPS time signal received from one or more GPS satellites in direct electromagnetic communication with the first distributed ledger object router;
   associating the timestamp data with the transaction data;
   encrypting the transaction data and the associated timestamp data;
   transmitting the encrypted transaction data and associated timestamp data to a first distributed ledger node and to at least one additional distributed ledger object router in electronic communication with the first distributed ledger object router;
   receiving the encrypted transaction data and associated timestamp data at the first distributed ledger node and unencrypting the transaction data and associated timestamp data;
   using the unencrypted timestamp data to determine the validity of the received transaction data of the first distributed ledger node or another ledger node, and transmitting the validity determination to each additional distributed ledger object router;
   obtaining a consensus on the validity of the transaction data based on validity determinations received from each additional distributed ledger object router;
   adding the transaction data to an immutable persistent data store of the first distributed ledger node only if the consensus on the validity of the transaction is a positive consensus;
   wherein the first distributed ledger node processes the transaction data independently and in real time using a first-in-first-out protocol based upon the timestamp data and validates the transaction independent of the validation determination of any other ledger node.

2. The method of claim 1 wherein the transaction data and associated timestamp data is encrypted using a physical quantum random number generator.

3. The method of claim 2 wherein the encryption step creates one or more of public encryption keys, private encryption keys, nonces, and one-time key pads.

4. The method of claim 2, where the physical quantum number generator generates a random binary string by based on a measurement of one or more of: electromagnetic field fluctuations in a vacuum, shot noise in an electrical circuit, nuclear decay detected by a Geiger counter, transmission of photons through a semi-permeable surface, and reflection of photons from a semi-permeable surface.

5. The method of claim 1 wherein the first distributed ledger node further determines the validity of the transaction by verifying the transaction data and executing a transaction logic associated with the transaction.

6. The method of claim 1 wherein the consensus on the validity of the transaction data is positive only once at least 51% of the additional distributed ledger object routers communicate a positive validity determination.

7. A decentralized computing system for processing distributed ledger transactions comprising:
- a client device having a distributed ledger transaction module to generate transaction data, which is in electronic communication with a first distributed ledger object router having a timestamp module, an encryption module, and a communication module;
- the timestamp module operating to generate a timestamp including timestamp data identifying when transaction data is generated by the distributed ledger transaction module, said timestamp data being directly derived from a GPS time signal obtained using a physical GPS receiver, said timestamp data having an accuracy of 100 nanoseconds or less;
- the encryption module operating to encrypt transaction data associated with the transaction using a physical quantum random number generator as at least a part of its operation;
- a first distributed ledger node associated with the first distributed ledger object router, the first distributed ledger node including a clock that maintains accuracy equal to the absolute time of the GPS time signal;
- a persistent, immutable data store;
- wherein when the client device initiates a transaction and generates transaction data, the first distributed ledger object router generates a timestamp including timestamp data, and encrypts transaction data and timestamp data associated with the transaction data, and transmits the encrypted transaction and timestamp data to the first distributed ledger node and to at least one additional distributed ledger object router,
- the first distributed ledger node writes the transaction data to the data store upon completion of the transaction, and
- the first distributed ledger node processes the transaction data independently and in real time using a first-in-first-out protocol based upon the timestamp data.

8. The system of claim 7 wherein the timestamp module generates the timestamp data using GPS signals from one or more GPS satellites in electromagnetic communication with the first distributed ledger object router.

9. The system of claim 7 wherein the encryption module creates one or more of public encryption keys, private encryption keys, nonces, and one-time key pads.

10. The system of claim 7 wherein the first distributed ledger node comprises a verification module;
- the verification module operating to determine the validity of the transaction by verifying the transaction data and timestamp data associated with the transaction and executing a transaction logic associated with the transaction; and
- the verification module generating a validity determination and transmitting the validity determination to the first distributed ledger object router, which in turn transmits the validity determination to each additional distributed ledger object router;
- wherein the verification module determines the validity of the transaction independent of any validity determination by each additional distributed ledger object router.

11. The system of claim 10 wherein the verification module further obtains a consensus on the validity of the transaction data based on validity determinations received from each additional distributed ledger object router, and the first distributed ledger node writes the transaction to the data store only if the consensus on the validity of the transaction is a positive consensus.

12. The system of claim 11 wherein a positive consensus on the validity of the transaction is obtained when at least 51% of the additional distributed ledger object routers communicate a positive validity determination.

13. The system of claim 7, where physical quantum number generator generates a random binary string by based on a measurement of one or more of: electromagnetic field fluctuations in a vacuum, shot noise in an electrical circuit, nuclear decay detected by a Geiger counter, transmission of photons through a semi-permeable surface, and reflection of photons from a semi-permeable surface.

14. A decentralized computing system for processing distributed ledger transactions comprising:
- a 5G enabled primary device comprising a first distributed ledger object router having a distributed ledger transaction module, a timestamp module, an encryption module, and a communication module and a first distributed ledger node comprising a verification module;
- the distributed ledger transaction module operating to generate transaction data associated with a distributed ledger transaction;
- the timestamp module operating to generate timestamp data associated with the distributed ledger transaction, including timestamp data identifying when the transaction data is generated;
- the encryption module operating to encrypt transaction data and timestamp data associated with the transaction; and
- a persistent, immutable data store;
- wherein the 5G enabled primary device initiates a transaction and generates transaction data, the first distributed ledger object router generates a timestamp including timestamp data, and encrypts transaction data and timestamp data associated with the transaction data, and transmits the encrypted transaction and timestamp data to the first distributed ledger node and to at least one 5G enabled secondary device within a threshold proximity of the 5G enabled primary device;
- wherein the verification module of the first distributed ledger node operates to verify the validity of the transaction based on received and unencrypted transaction data and timestamp data and independent of any validity determinations by each 5G enabled secondary device, and to generate a validity determination, which the communication module of the first distributed ledger object router transmits to each 5G enabled secondary device within the proximity threshold, and obtains a consensus on the validity of the transaction based on validity determinations received from each 5G enabled secondary device within the proximity threshold;
- wherein the first distributed ledger node processes the transaction data independently and in real time using a first-in-first-out protocol based upon the timestamp data; and
- wherein the first distributed ledger node writes the transaction to the data store only if the consensus on the validity of the transaction is a positive consensus.

15. The system of claim 14 wherein each 5G enabled secondary device comprises a secondary distributed ledger object router and a secondary distributed ledger node.

16. The system of claim 14 wherein the timestamp module generates the timestamp including timestamp data using a nanosecond time scale accurate to 100 nanoseconds or less.

17. The system of claim 16 wherein:
the timestamp module generates the timestamp data using GPS signals from one or more GPS satellites in electromagnetic communication with the first distributed ledger object router; and
the first distributed ledger node further comprises an internal clock that maintains accuracy equal to the absolute time of the GPS signals.

18. The system of claim 14 wherein the encryption module encrypts data associated with the transaction using a physical quantum random number generator as at least a part of its operation.

19. The system of claim 18 wherein the encryption module creates one or more of public encryption keys, private encryption keys, nonces, and one-time key pads.

20. The system of claim 18, where physical quantum number generator generates a random binary string by based on a measurement of one or more of: electromagnetic field fluctuations in a vacuum, shot noise in an electrical circuit, nuclear decay detected by a Geiger counter, transmission of photons through a semi-permeable surface, and reflection of photons from a semi-permeable surface.

21. The system of claim 14 wherein the verification module determines the validity of the transaction by verifying the transaction data associated with the transaction and executing a transaction logic associated with the transaction.

* * * * *